United States Patent
Seol et al.

(10) Patent No.: US 7,286,724 B2
(45) Date of Patent: Oct. 23, 2007

(54) METHOD AND APPARATUS FOR SEARCHING, BROWSING AND SUMMARIZING MOVING IMAGE DATA USING FIDELITY FOR TREE-STRUCTURE MOVING IMAGE HIERARCHY

(75) Inventors: Sang Hoon Seol, Kangnam-ku (KR); Jung Rim Kim, Kuro-ku (KR); Yu Nam Kim, Jaeju-do (KR); Hyun Sung Chang, Daejun-shi (KR)

(73) Assignee: Hyundai Curitel, Inc., Kyoungki-do (KR)

(*) Notice: Subject to any disclaimer, the term of this patent is extended or adjusted under 35 U.S.C. 154(b) by 0 days.

(21) Appl. No.: 10/902,969

(22) Filed: Jul. 30, 2004

(65) Prior Publication Data

US 2005/0094901 A1 May 5, 2005

Related U.S. Application Data

(63) Continuation-in-part of application No. 09/731,197, filed on Dec. 6, 2000, now Pat. No. 6,792,163.

(30) Foreign Application Priority Data

Dec. 6, 1999 (KR) ............................... 1999-55228

(51) Int. Cl.
G06K 9/54 (2006.01)

(52) U.S. Cl. ........................ 382/305; 382/236
(58) Field of Classification Search ............... 382/305, 382/199, 266, 227, 236, 276, 240; 345/440
See application file for complete search history.

(56) References Cited

U.S. PATENT DOCUMENTS

| | | | |
|---|---|---|---|
| 4,989,258 A * | 1/1991 | Takahashi et al. ........... 382/226 |
| 5,559,562 A | 9/1996 | Ferster | |
| 5,995,095 A | 11/1999 | Ratakonda | |
| 6,026,179 A * | 2/2000 | Brett ............................ 382/162 |
| 6,028,645 A | 2/2000 | Reid et al. | |
| 6,097,853 A | 8/2000 | Gu et al. | |
| 6,195,470 B1 * | 2/2001 | Sasaki et al. ................ 382/277 |
| 6,278,497 B1 * | 8/2001 | Sumiyoshi et al. .......... 348/722 |
| 6,298,145 B1 | 10/2001 | Zhang et al. | |
| 6,331,859 B1 | 12/2001 | Crinon | |
| 6,369,826 B1 * | 4/2002 | Shimotono et al. .......... 345/589 |
| 6,535,639 B1 * | 3/2003 | Uchihachi et al. ........... 382/225 |
| 6,560,281 B1 * | 5/2003 | Black et al. ................. 375/240 |
| 2001/0003468 A1 | 6/2001 | Hampapur et al. | |
| 2002/0083032 A1 | 6/2002 | Bourges-Sevenier | |

* cited by examiner

*Primary Examiner*—Duy M. Dang
(74) *Attorney, Agent, or Firm*—Merchant & Gould P.C.

(57) ABSTRACT

A method and apparatus for searching, browsing and summarizing moving image data using the fidelity of a tree-structured moving image hierarchy, which can partition or divide the moving image data into predetermined units, extract a key frame or representative frame from each of the partitioned or divided units, create a tree-structured key frame hierarchy on the basis of the extracted key frames, store a fidelity value of each of the key frames, which is a sub-tree information representative degree of each key frame, at an edge between adjacent ones of the key frames, and effectively and efficiently search, browse and summarize the moving image data using the stored fidelity values. Therefore, a query image or video clip desired by a user can more rapidly and accurately be searched for.

6 Claims, 9 Drawing Sheets

F : FIDELITY VALUE

F 3 : KEY FRAME (REPRESENTATIVE FRAME)

(a)

Segment S (b)

Segment S (c)

F : FIDELITY VALUE (a)

(b)

METHOD AND APPARATUS FOR SEARCHING, BROWSING AND SUMMARIZING MOVING IMAGE DATA USING FIDELITY FOR TREE-STRUCTURE MOVING IMAGE HIERARCHY

This application is a Continuation-in-Part of U.S. patent application Ser. No. 09/731,197, filed 6 Dec. 2000, now U.S. Pat. No. 6,792,163, and claims priority to Republic of Korean application 1999-55228 filed 6 Dec. 1999, which is specifically incorporated by reference herein.

BACKGROUND OF THE INVENTION

1. Field of the Invention

The present invention relates in general to a method and apparatus for searching, browsing and summarizing moving image data, and more particularly to a method and apparatus for searching, browsing and summarizing moving image data using the fidelity of a tree-structured moving image hierarchy, which can partition or divide the moving image data into predetermined units (for example, shots or segments), extract a key frame from each of the partitioned or divided units, create a tree-structured key frame hierarchy on the basis of the extracted key frames, store a fidelity value of each of the key frames, which is a sub-tree information representative degree of each key frame, at an edge between adjacent ones of the key frames, and effectively and efficiently search, browse and summarize the moving image data using the stored fidelity values.

2. Description of the Prior Art

Conventional methods for searching and browsing moving image data have carried out the searching and browsing using key frames. However, such conventional searching and browsing methods have had a limitation in effectively and efficiently searching and browsing moving image data, because they did not consider the fidelity of key frames. One such method may be, for example, a still image searching and browsing method proposed by Purdue University, which is capable of raising a searching speed by a considerable degree using a branch and bound searching technique based on triangle inequality obtained by applying tree-structured vector quantization (TSVQ) to still image data. The browsing method proposed by Purdue University is an active browsing method based on a hierarchical similarity pyramid, each level of which includes a cluster of similar images created in a 2-D grid. The similarity pyramid has a smaller cluster at its lower level and a structure representative of each image at its lowest level. This proposed browsing method has pruning and reorganization functions as its fundamental functions, thereby effectively performing the browsing operation on the basis of user relevance feedback information. However, the above-mentioned browsing method is only a one-sided mode of a server and provides no benchmark for a user to determine how effective the browsing is.

In conclusion, the still image searching and browsing method proposed by Purdue University merely leads a user to a one-sided still image searched result of a server without setting a threshold value for a user's satisfactory level. Further, the proposed browsing method extracts key frames from moving image data and performs the browsing operation using the extracted key frames, but does not present how effectively the browsing operation represents the moving image data. Moreover, this searching and browsing method is not very efficient because it utilizes not one tree structure, but individual tree structures formed by different mechanisms.

On the other hand, considering studies on rate-constraints moving image summary, there has been proposed a key frame extraction technology based on a restriction in time. However, this technology provides not a moving image summary method for satisfying a user's desired time, but an algorithm for extracting respective key frames from clusters of similar frames at intervals of a predetermined threshold range, or a predetermined period of time or more. In other words, the proposed key frame extraction technology does not provide a moving image summary method capable of summarizing, for example, a two hours-required moving image to a ten minutes-required amount. In conclusion, there is a pressing need for the development of a moving image search, browsing and summary method capable of effectively summarizing moving image data to the amount required for a time period desired by a user.

SUMMARY OF THE INVENTION

Therefore, the present invention has been made in view of the above problems, and it is an objective of the present invention to provide a method and apparatus for effectively and efficiently searching, browsing and summarizing moving image data using the fidelity of a key frame hierarchy.

It is another objective of the present invention to provide a method and apparatus for searching, browsing and summarizing moving image data using the fidelity of a key frame hierarchy, which can apply a threshold value to a fidelity value of each key frame, effectively perform the browsing operation within the range of the applied threshold value, extract key frames of the number desired by a user from the moving image data and summarize the moving image data on the basis of fidelity values of the extracted key frames.

In accordance with one aspect of the present invention, the above and other objectives can be accomplished by a provision of a method for expressing moving image data of a tree-structured moving image hierarchy, comprising the step of storing a fidelity value of each key frame of the tree-structured moving image hierarchy at an edge between adjacent ones of the key frames.

In accordance with another aspect of the present invention, there is provided an apparatus for searching, browsing and summarizing moving image data of a tree-structured moving image hierarchy, comprising a unit boundary detector for detecting the boundary of each moving image unit from the moving image data to partition the moving image data into the moving image units; a key frame extractor for extracting a key frame from each of the moving image units partitioned by the unit boundary detector; a search engine application unit for searching for a specific moving image on the basis of the key frame extracted by the key frame extractor; a browsing device application unit for browsing information of the specific moving image on the basis of the key frame extracted by the key frame extractor; and a moving image summary device application unit for expressing the information of the specific moving image significantly on the basis of the key frame extracted by the key frame extractor.

In accordance with yet another aspect of the present invention, there is provided a method for searching for moving image data of a tree-structured moving image hierarchy, comprising six steps. The first step is allowing a user to enter a desired query frame. The second step is comparing the query frame entered by the user with a highest-level key frame of an indexed moving image tree structure in a database to determine whether the two frames are similar to each other. The third step is searching for a lower-level path if the query frame and the highest-level key frame are similar to each other. The fourth step is determining whether the highest-level key frame has a high fidelity value if the query frame and the highest-level key frame are not similar to each other, pruning a search path to the highest-level key frame and searching for a new path if the highest-level key frame has the high fidelity value and searching for the lower-level path if the highest-level key frame has a low fidelity value. The fifth step is determining whether a key frame currently compared with the query frame belongs to a lowest level after searching for the lower-level path, determining whether the currently compared key frame is similar to the query frame if it belongs to the lowest level, storing the currently compared key frame if it is similar to the query frame and searching for a new path if the currently compared key frame is not similar to the query frame. The sixth step is determining whether the search operation has been completed up to the lowest level after storing the currently compared key frame, displaying the stored frame if the search operation has been completed and returning to the above fifth step unless the search operation has been completed up to the lowest level.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

The present invention is characterized in that it searches, browses and summarizes moving image data using the fidelity of a tree-structured key frame hierarchy.

In the present invention, a key frame, also called a representative frame, signifies one frame representative of all frames in given moving image data (shot or segment). In other words, for a moving image partitioned into predetermined units (for example, shots or segments), a frame representative of a quantitative threshold range can exist because each of the partitioned units has a characteristic or semantic redundancy. Hence, such a representative frame can be referred to as a key frame. For example, a frame f3 can be set as a key frame representative of five frames f1, f2, f3, f4 and f5 in FIG. 1a.

Figure 1:
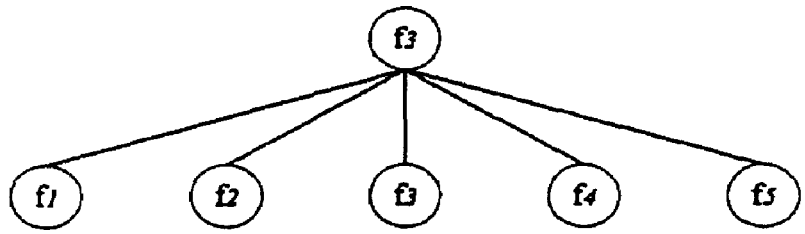
FIGS. 1a-1c are conceptual diagrams explaining the definition of key frames and illustrating a key frame extraction method.
Figure 1:
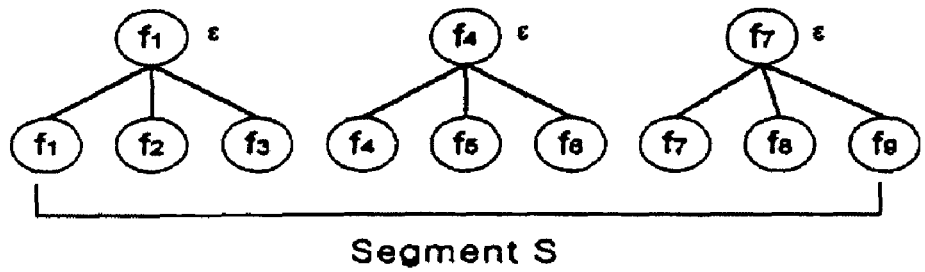
Figure 1:
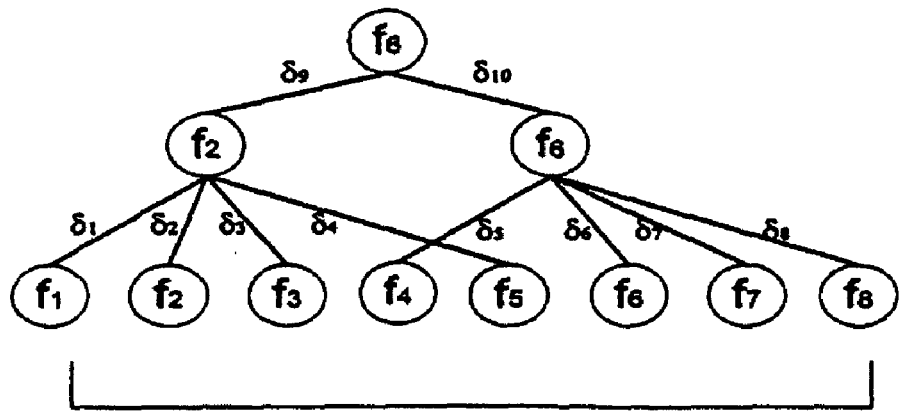

In the present invention, a key frame extraction method is not subjected to any particular limitation and so may be the most effective one among a variety of existing key frame extraction methods. Several examples of existing key frame extraction methods are as follows:

1) selecting the first frame of a shot as a key frame (see FIG. 1b);

2) selecting the first and last frames of a shot as key frames;

3) extracting a key frame based on a motion indicator of a shot;

4) extracting a key frame based on an activity indicator of a shot;

5) extracting a key frame based on a visual content complexity indicator; and 6) extracting a key frame through the formation of a composite image based on a camera motion.

Many other key frame extraction methods than the above-mentioned methods have been proposed and continue to be studied now. Although a key frame extraction method useable in the present invention is not subjected to any particular limitation as stated above, a visual content complexity indicator-based key frame extraction method will be proposed in an embodiment of the present invention. This key frame extraction method based on a visual content complexity indicator is adapted to extract a minimum number of key frames within a predetermined error range on the basis of a point set theory.

FIG. 1c shows a moving image tree structure including the total eight key frames arranged on the basis of a top-down tree organization method proposed in the above. In the structure of FIG. 1c, differently from the structure of FIG. 1b, one key frame is selected in consideration of even a high-similarity frame that is apart from the key frame in view of time. An example of quantitative formular expression of such a key frame extraction method is as follows:

$$\delta 9 = \max \{d(f6,f1), d(f6,f2), d(f6,f3), d(f6,f5)\}$$

$$\delta 10 = \max \{d(f6,f4), d(f6,f6), d(f6,f7), d(f6,f8)\}$$

where, d(fi,fj) is a distance metric (i.e., satisfying a triangular property) that represents a similar degree or similarity.

Assuming that a user searches for a query image fq through the above key frame extraction method and δ10<δ9, a value d(fq,f6) can be expressed within an error range e given by the user as follows.

Firstly, if d(fq,f6)<δ10+e, both the two sub-trees are searched.

Secondly, if $\delta10+e<d(fq,f6)<\delta9+e$, one sub-tree having f2 as its root is pruned and the other sub-tree (having f6 as a root) is searched.

Thirdly, if $\delta9+e<d(fq,f6)$, both the two sub-trees are pruned.

The above key frame extraction method is adapted to minutely check unnecessary comparison steps resulting from the top-down search for the query image fq, so as to set the pruning conditions more precisely than existing methods. As a result, this key frame extraction method has the effect of slightly increasing search efficiency with the pruning possibility increased.

An alternative method to select the best N key frames in a key frame hierarchy uses a Max-Cut algorithm. One of the criteria is to select N key frames resulting in the maximum fidelity. This method is used to find a max-cut point, which maximizes the minimum edge cost cut by a cutting line (CL) in the tree.

The fidelity, or degree of representativeness, which is the core of the present invention, signifies a value of an extracted key frame representative of progeny frames in the process of extracting the key frame from moving image information. This fidelity may be either quantitative information or qualitative information. Because selected key frames are representative of their sub-trees, respectively, the fidelity of each key frame is defined as the minimum one among fidelity values of frames attached to sub-trees branched from each key frame. The present invention is capable of effectively and efficiently searching, browsing and summarizing moving image data using such key frame fidelity, thereby providing a more satisfactory searched result image to a user and more rapidly and significantly expressing the moving image data upon browsing it. Further, the present invention is capable of providing a rate-constrained summary of moving image data. For example, an arbitrary number of key frames must be extractable from moving image data in order to provide a moving image summary at a constrained rate. The present invention is capable of providing a moving image summary based on a predetermined fidelity value.

According to the present invention, a fidelity value can be calculated in various ways, several examples of which will hereinafter be described. A fidelity value can be calculated by an encoder or assigned by a user. Then, for efficient search, browsing and other applications, a decoder utilizes the following values.

A) Fidelity: Maximum Frame Distance

This quantitative fidelity value represents the maximum distance between a key frame and its progeny frames, which is in inverse proportion to a feature descriptor (for example, a color histogram) and similarity (for example, L1 norm) used for key frame extraction.

B) Fidelity: a Real Number Between 0 and 1 for Normalization (Qualitative Information)

1: A key frame represents its progeny frames perfectly.

0.8: A key frame represents its progeny frames very well.

0.6: A key frame represents its progeny frames well.

0.4: A key frame represents its progeny frames appropriately.

0.2: A key frame does not represent its progeny frames considerably.

A higher fidelity value signifies that a key frame better represents its progeny frames.

C) Fidelity: Maximum Distance Frame ID

This represents an ID (fm) of one among progeny frames of a key frame, having the longest distance to the key frame. That is, it is an ID of a progeny frame most dissimilar to the key frame.

D) Fidelity: Progeny Frame Variance

This fidelity is in proportion to a variance of feature descriptors of progeny frames of a key frame. Provided that a similarity value approximates a Gaussian distribution, a sigma core will provide a fidelity value.

Figure 2:
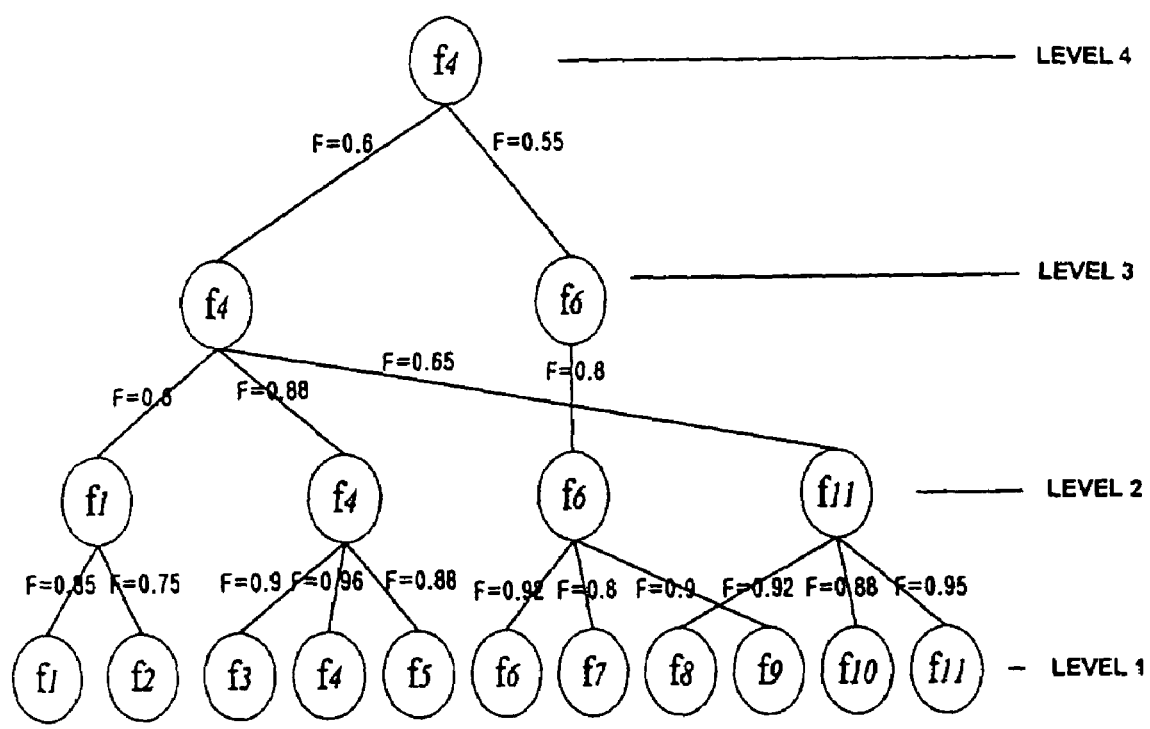
FIG. 2 is a view showing an indexed moving image tree structure used for the explanation of a method for searching, browsing and summarizing moving image data using the fidelity of a key frame hierarchy in accordance with the present invention.

FIG. 2 is a view showing an indexed moving image tree structure used for the explanation of a method for searching, browsing and summarizing moving image data using the fidelity of a key frame hierarchy in accordance with the present invention. First, the system extracts eleven key frames from a given moving image using the key frame extraction method proposed above, sets an error range containing a property value of all the extracted key frames and sets f4 as a root. Then, the system adjusts the error range set at the previous step to a smaller value, extracts f4 and f6 within the adjusted error range and organizes the extracted f4 and f6 as sub-trees. In the same manner, for the subsequent lower level, the system adjusts the error range set for tree organization at the previous step to a smaller value. As a result, the lower the level becomes, the higher the degree of frame definition becomes. This top-down tree organization assures a better balance of the tree structure than the existing down-top tree organization because it ensures that the key frames extracted within the respective error ranges entirely include a similar number of progeny key frames as long as the error ranges are appropriately set for tree organization. On the contrary, in the existing down-top tree organization, progeny key frames included in respective parent key frames are not uniform in number. Due to this property, for a balanced tree, a considerable portion thereof is pruned during the search operation so that the search time can be shortened by a considerable amount. Although parent key frames include substantially the same number of progeny key frames with the organization of no tree, the organization of a top-down tree structure results in a sub-optimal degree of correspondence.

The present invention is characterized in that a key frame fidelity value is stored at an edge between adjacent key frames in a given tree structure instead of a node. This makes it possible to more clearly and minutely express moving image information and set pruning conditions in moving image search more precisely, so as to obtain the better searched results. The fidelity of a key frame is a value entirely explaining the property of sub-trees having the key frame as the highest-level node. For example, in FIG. 2, fidelity values 0.6, 0.88 and 0.65 of a key frame f4 positioned at a level 3 signify that the key frame f4 of the level 3 represents information of f1 and f2 belonging to its left sub-tree to the degree of 0.6, information of f3, f4 and f5 belonging to its middle sub-tree to the degree of 0.88 and information of f8, f10 and f11 belonging to its right sub-tree to the degree of 0.65, respectively. For another example, fidelity values 0.92, 0.88 and 0.95 of a key frame f11 positioned at a level 2 signify values indicative of degrees that the key frame f11 of the level 2 represents information of its progeny frames as a root of f8, f10 and f11, respectively. Although f11 is the same frame, its fidelity value is not 1 because the lowest-level frames are not inherent moving image frames but extracted key frames. The higher the fidelity value becomes, the better the key frame represents the lower-level frames belonging thereto. That is, the higher the fidelity value becomes, the higher the similarity between the key frame and the associated lower-level frames becomes. In conclusion, it can be seen from the above that the fidelity and the inter-frame distance are in inverse proportion to each other.

Figure 3:
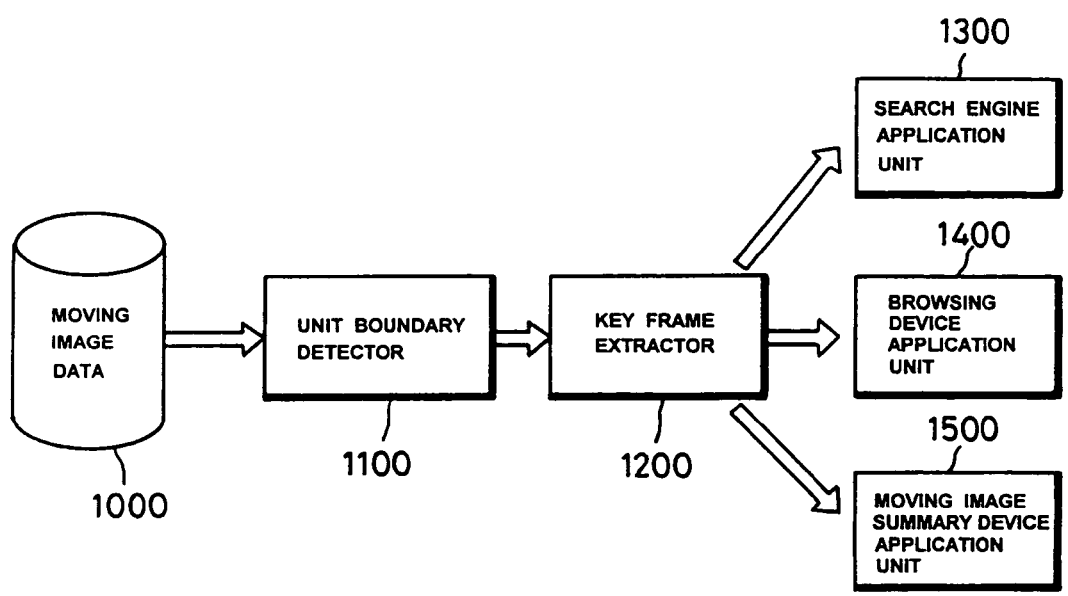
FIG. 3 is a block diagram showing the construction of an apparatus for searching, browsing and summarizing moving image data using the fidelity of a tree-structured moving image hierarchy in accordance with the present invention.

With reference to FIG. 3, there is shown in block form the construction of an apparatus for searching, browsing and summarizing moving image data using the fidelity of a tree-structured moving image hierarchy in accordance with the present invention. As shown in this drawing, the present apparatus comprises a unit boundary detector 1100 for detecting the boundary of each moving image unit (shot or segment) from moving image data 1000 to partition the moving image data 1000 into the moving image units, a key frame extractor 1200 for extracting a key frame from each of the moving image units partitioned by the unit boundary detector 1100, a search engine application unit 1300 for searching for a specific moving image on the basis of the key frame extracted by the key frame extractor 1200, a browsing device application unit 1400 for browsing information of the specific moving image on the basis of the key frame extracted by the key frame extractor 1200, and a moving image summary device application unit 1500 for expressing the information of the specific moving image significantly on the basis of the key frame extracted by the key frame extractor 1200.

Figure 4:
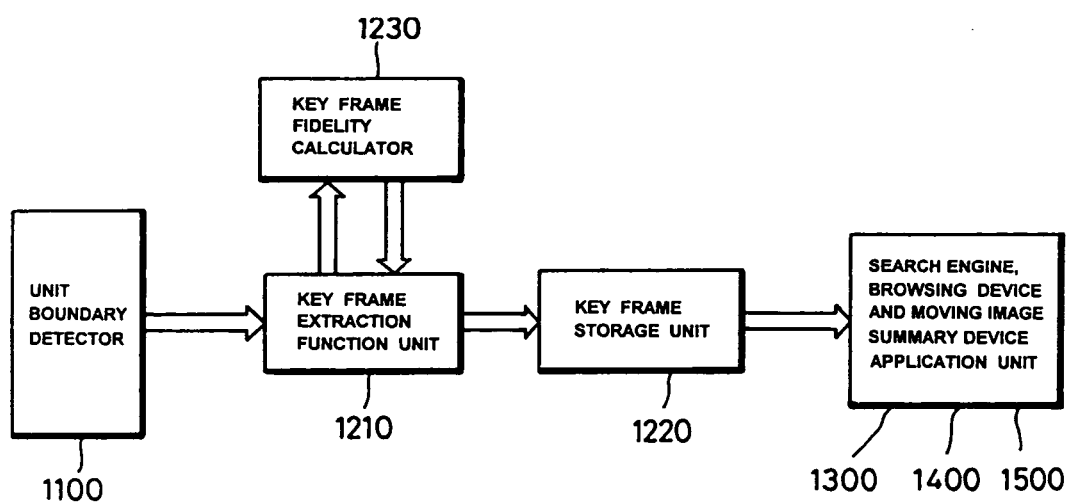
FIG. 4 is a detailed block diagram of a key frame extractor in FIG. 3.

FIG. 4 is a detailed block diagram of the key frame extractor 1200 in FIG. 3. As shown in this drawing, the key frame extractor 1200 includes a key frame extraction function unit 1210, a key frame storage unit 1220 and a key frame fidelity calculator 1230. The key frame extraction function unit 1210 is adapted to extract a predetermined number of key frames from each of the moving image units partitioned by the unit boundary detector 1100 on the basis of a predetermined key frame extraction function. In the present invention, the key frame extraction function can be any existing function without being subjected to any particular limitation. For example, the key frame extraction function unit 1210 may use a key frame extraction function for extracting a minimum number of key frames within a predetermined error range using a visual content complexity indicator.

If the key frame extraction function unit 1210 extracts the key frames from each of the moving image units partitioned by the unit boundary detector 1100, then it transfers the extracted key frames to the key frame storage unit 1220, which then stores numbers of the transferred key frames, corresponding respectively to the moving image units. Thereafter, the key frame fidelity calculator 1230 calculates a fidelity value of each of the key frames stored in the key frame storage unit 1220. With the operations of the key frame storage unit 1220 and key frame fidelity calculator 1230 repeated, the final key frame applied with the fidelity of the moving image data 1000 is extracted from each of the moving image units. This extracted final key frame is applied to the search engine application unit 1300, browsing device application unit 1400 and moving image summary device application unit 1500 such that it is used for effective and efficient moving image search, browsing and summary.

In the present invention, the key frame storage unit 1220 is adapted to store the fidelity value calculated by the key frame fidelity calculator 1230 at an edge between adjacent ones of the key frames stored therein. Further, the moving image summary device application unit 1500 is adapted to process key frames of the number based on a user's input or appropriate to a user's environment.

Figure 5:
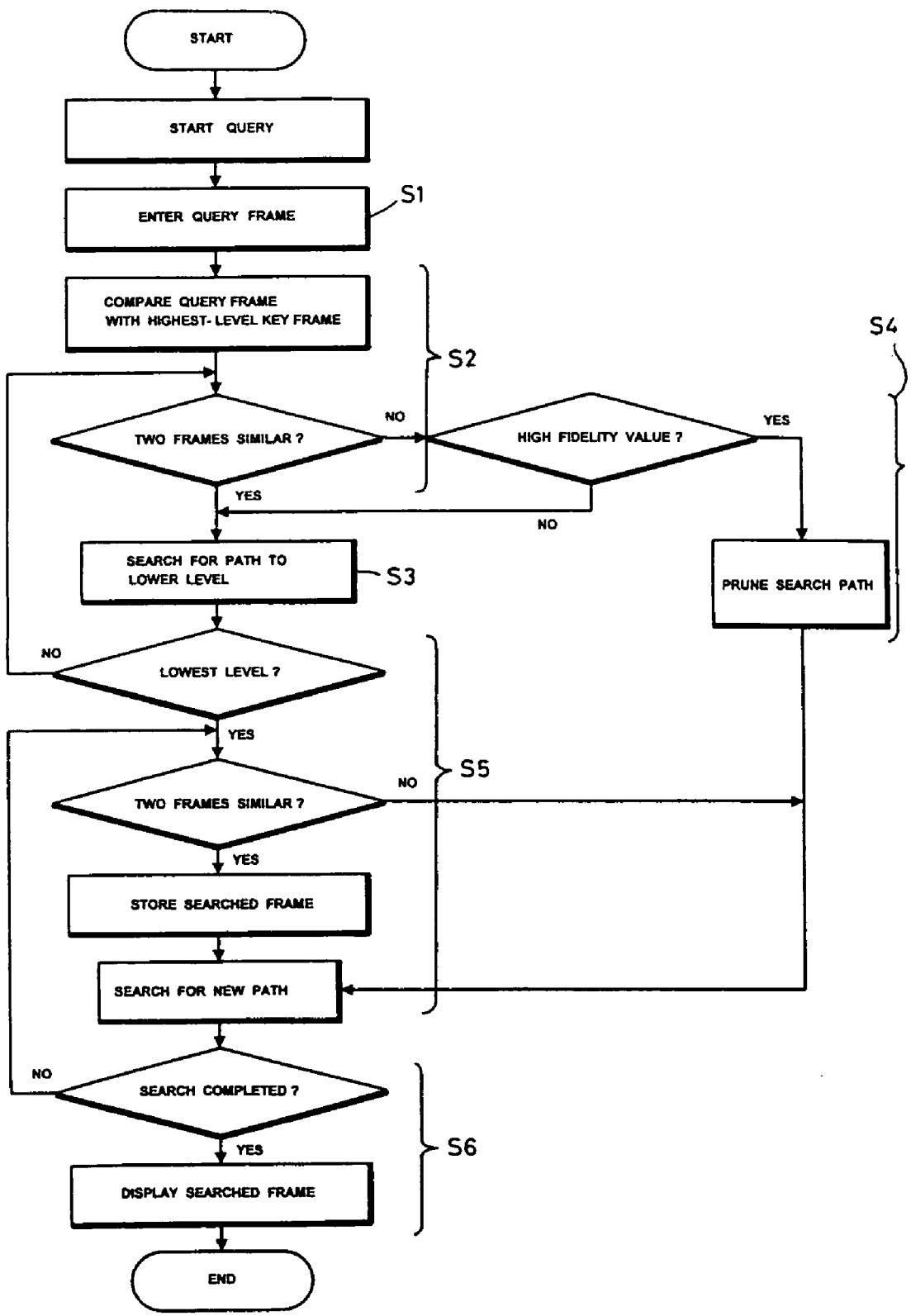
FIG. 5 is a flowchart illustrating a search method using the fidelity of a key frame hierarchy in accordance with an embodiment of the present invention.

FIG. 5 is a flowchart illustrating a moving image search method using the fidelity of a key frame hierarchy in accordance with an embodiment of the present invention. As shown in this drawing, first, a user enters a desired query frame to start a query (S1). In response to the query from the user, the system compares the query frame entered by the user with a highest-level key frame of an indexed moving image tree structure in a database to determine whether the two frames are similar to each other (S2). If the query frame and the highest-level key frame are determined to have a high similarity therebetween, then the system searches for a path to the lower level (S3). On the contrary, if the query frame and the highest-level key frame are determined to have a low similarity therebetween, then the system determines whether the highest-level key frame has an appropriate fidelity value or high fidelity value. If the highest-level key frame has a high fidelity value, then the system prunes a search path to the highest-level key frame and searches for a new path. Alternatively, if the highest-level key frame has a low fidelity value, then the system searches for the path to the lower level (S4). After searching for the path to the lower level, the system determines whether a key frame currently compared with the query frame entered by the user belongs to the lowest level. If the currently compared key frame belongs to the lowest level, the system determines whether it is similar to the query frame. Upon determining that the currently compared key frame is similar to the query frame, the system stores it. However, in the case where the currently compared key frame is not similar to the query frame, the system searches for a new path (S5). After storing the searched frame, the system determines whether the search operation has been completed up to the lowest level. If the search operation has been completed, then the system displays the searched frame. On the contrary, unless the search operation has been completed up to the lowest level, then the system returns to the above step S5 to repeat the similarity comparison up to the lowest level (S6).

Figure 6:
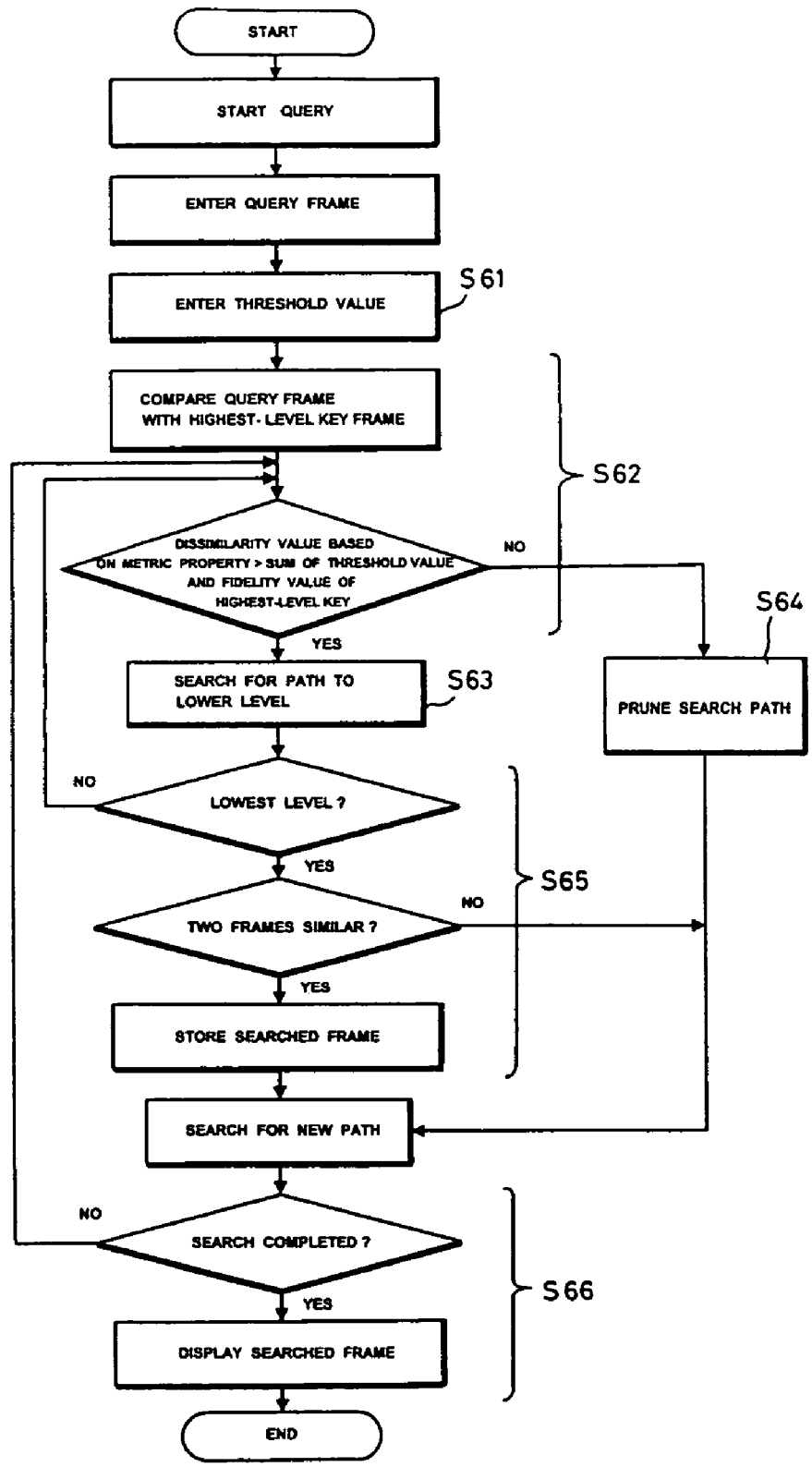
FIG. 6 is a flowchart illustrating a search method using the fidelity of a key frame hierarchy and a metric property in accordance with an alternative embodiment of the present invention.

FIG. 6 is a flowchart illustrating a search method of a search engine using the fidelity of a key frame hierarchy and a metric property in accordance with an alternative embodiment of the present invention. As shown in this drawing, first, a user enters a desired query frame to start a query (S61). At this time, the user enters a threshold value for his satisfactory level together with the desired query frame for moving image search. In response to the query from the user, the system compares the query frame entered by the user with a highest-level key frame of an indexed moving image tree structure in a database to determine whether a dissimilarity value based on a metric property is higher than the sum of the threshold value entered by the user and a fidelity value of the highest-level key frame (S62). In the case where it is determined at the above step S62 that the dissimilarity value is higher than the sum of the threshold value and the fidelity value of the highest-level key frame, the system searches for a path to the lower level (S63). On the contrary, upon determining at the above step S62 that the dissimilarity value is not higher than the sum of the threshold value and the fidelity value of the highest-level key frame, the system prunes a search path to the highest-level key frame and searches for a new path (S64). After searching for the path to the lower level, the system determines whether a key frame currently compared with the query frame entered by the user belongs to the lowest level. If the currently compared key frame belongs to the lowest level, the system determines whether it is similar to the query frame. Upon determining that the currently compared key frame is similar to the query frame, the system stores it. However, in the case where the currently compared key frame is not similar to the query frame, the system searches for a new path (S65). After storing the searched frame, the system determines whether the search operation has been completed up to the lowest level. If the search operation has been completed, then the system displays the searched frame. On the contrary, unless the search operation has been completed up to the lowest level, then the system returns to the above step S62 to repeat the metric property-based dissimilarity value comparison (S66).

Figure 7:
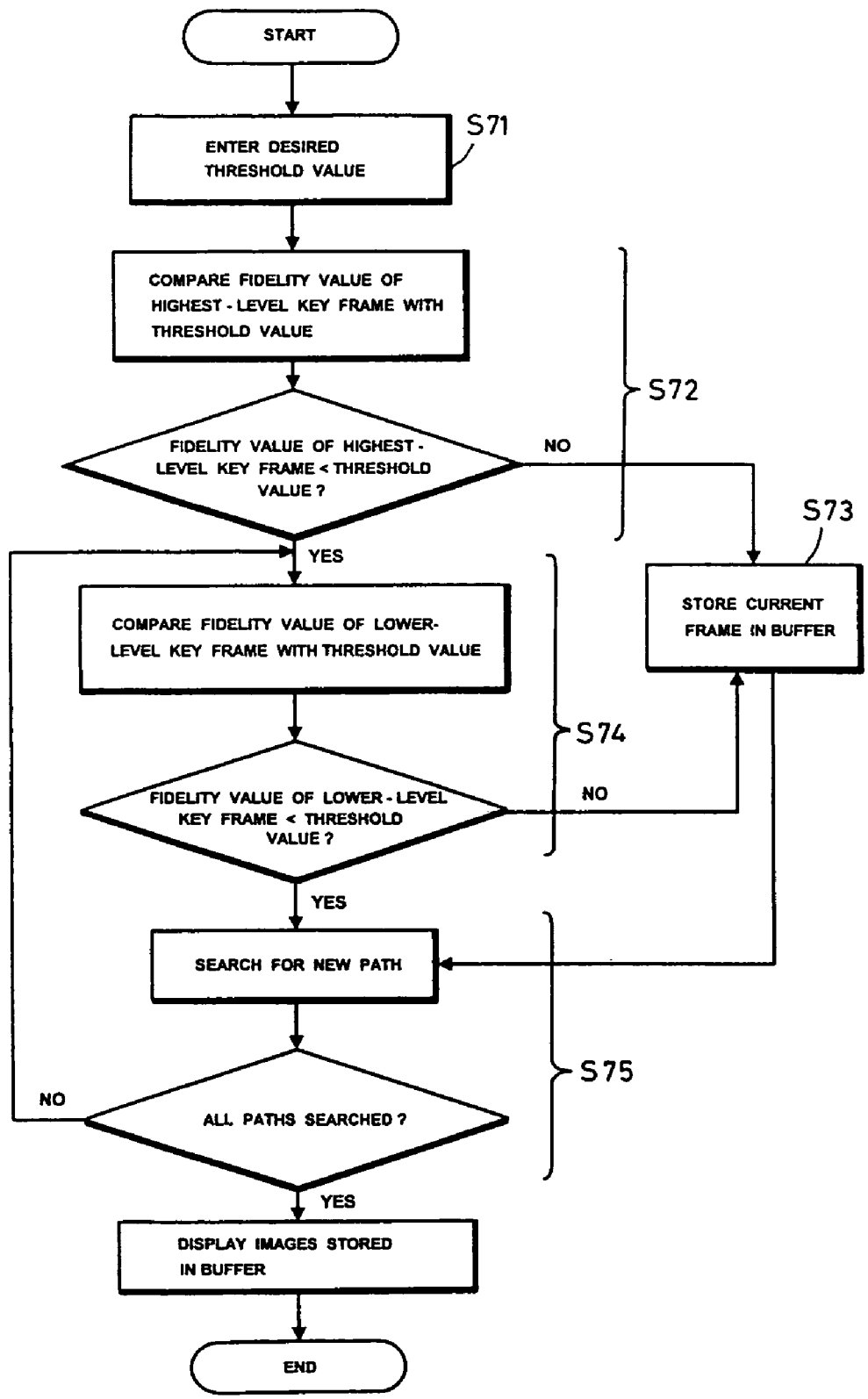
FIG. 7 is a flowchart illustrating a browsing method of a browsing device using the fidelity of a key frame hierarchy in accordance with the present invention.

FIG. 7 is a flowchart illustrating a moving image browsing method of a browsing device using the fidelity of a key frame hierarchy in accordance with the present invention. As shown in this drawing, first, a user requests a server to browse and enters a desired threshold value (S71). In response to the browsing request from the user, the server compares a fidelity value of a highest-level key frame in a database with the threshold value entered by the user (S72). Upon determining at the above step S72 that the fidelity value of the highest-level key frame is higher than or equal to the threshold value, the system stores the highest-level key frame in a buffer (S73). On the contrary, if the fidelity value of the highest-level key frame is smaller than the threshold value, the system enters into a new path to the lower level to compare a fidelity value of a lower-level key frame with the threshold value. If the fidelity value of the lower-level key frame is higher than or equal to the threshold value, the system stores the lower-level key frame in the buffer. However, in the case where the fidelity value of the lower-level key frame is smaller than the threshold value, the system enters into a new path to the lower level to repeat the above procedure (S74). Thereafter, the system determines whether all paths have been searched up to the lowest level. If all paths have been searched up to the lowest level, then the system displays images stored in the buffer (S75).

Figure 8:
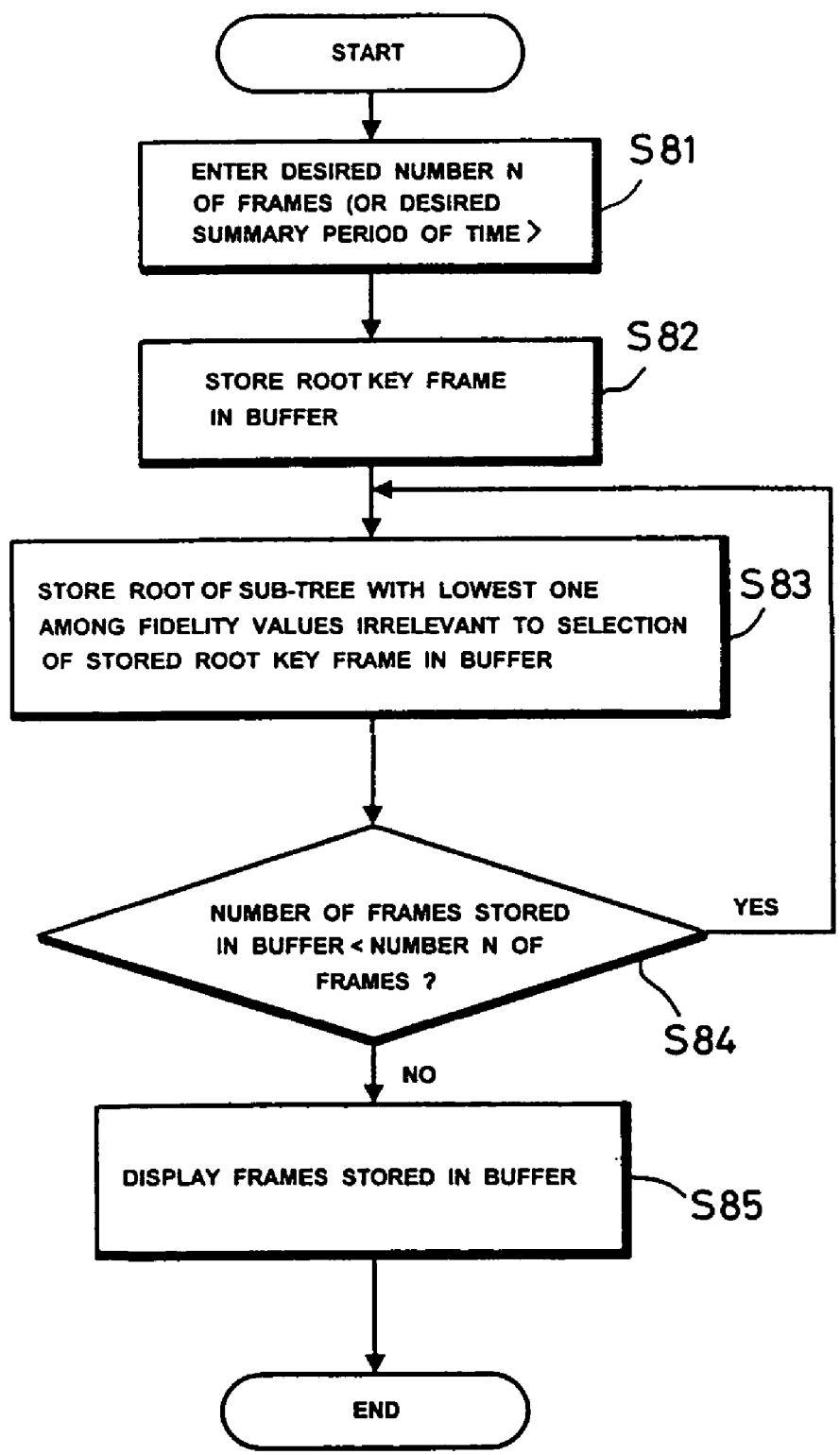
FIG. 8 is a flowchart illustrating a method for summarizing a tree-structured moving image hierarchy in accordance with the present invention.

FIG. 8 is a flowchart illustrating a method for summarizing a tree-structured moving image hierarchy in accordance with the present invention. In the present invention, the moving image summary method can be performed on the basis of a predetermined number of frames and their fidelity values. As shown in FIG. 8, first, a user enters a desired number N of frames or a desired summary period of time (S81). Then, the system stores a root key frame in a buffer (S82). The system further stores a root of a sub-tree with the lowest one among fidelity values irrelevant to the selection of the stored root key frame in the buffer (S83). While roots of sub-trees with the lower fidelity values are continuously stored in the buffer beginning with the root key frame in this manner, the system determines whether the number of frames stored in the buffer is greater than or equal to the number N of frames desired by the user. If the number of frames stored in the buffer is smaller than the number N of frames desired by the user, then the system returns to the above step S83 to repeat the above procedure until it arrives at the desired number N of frames (s84). Thereafter, at the moment that the number of frames stored in the buffer arrives at the desired number N of frames, the system displays the stored frames (S85).

Figure 9:
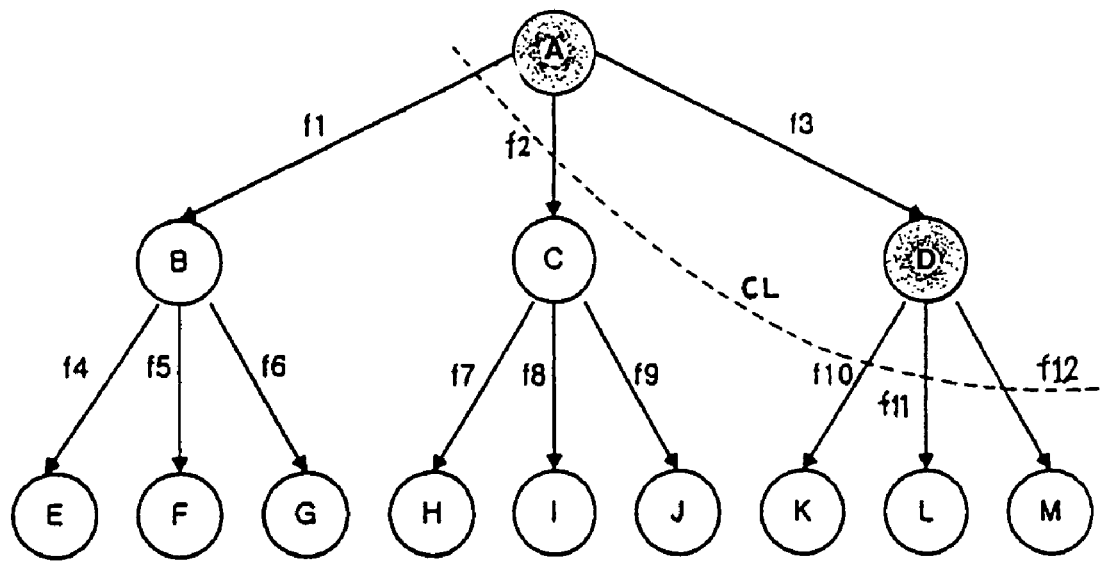
FIGS. 9a and 9b are conceptual diagrams explaining a Max-Cut algorithm used for key frame extraction in accordance with the present invention.
Figure 9:
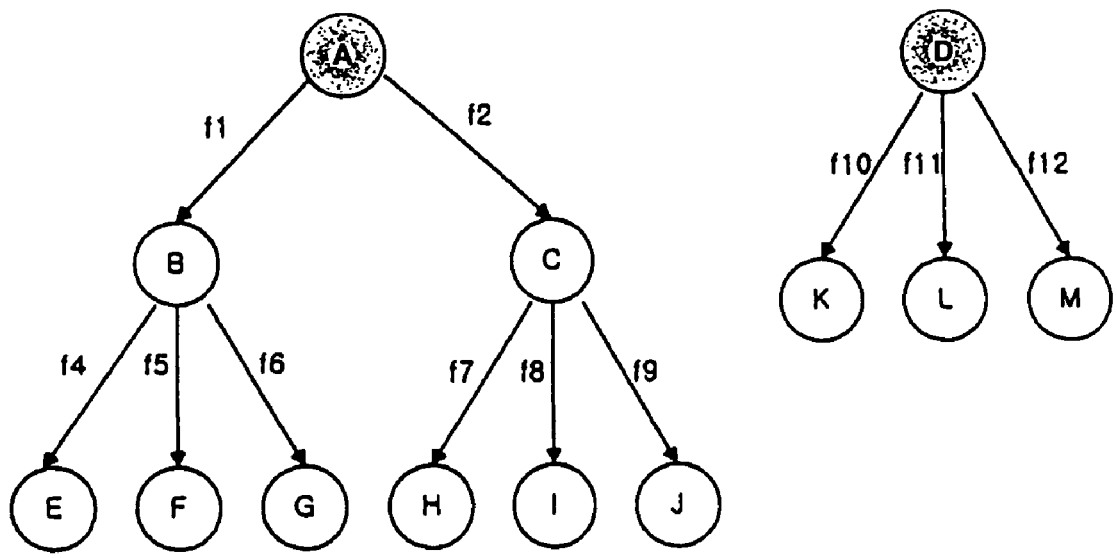

FIGS. 9a and 9b are conceptual diagrams explaining a Max-Cut algorithm used for key frame extraction in accordance with the present invention. For summarizing a tree-structured moving image hierarchy in FIG. 9a on the basis of the number of frames desired by the user, a root key frame A is selected when one frame is desired by the user. Where two frames are desired by the user, the root key frame A and any one of roots B, C and D of its sub-tree are selected. For the selection of any one of the roots B, C and D, fidelity values of the root key frame A representative of the sub-tree roots B, C and D are compared with one another and an edge with the lowest fidelity value is pruned, thereby organizing a two-tree structure. For example, assuming that f3 is smallest among f1, f2 and f3 in FIG. 9a, an edge linking between A and D is pruned and a tree structure as shown in FIG. 9b is thus organized. As a result, the root D of the sub-tree of the pruned edge is selected. In the same manner, for the extraction of N frames, roots of sub-trees with the lowest fidelity values are continuously extracted from among roots of divided trees until N roots are extracted. Therefore, the moving image summary method can be optimally performed on the basis of a predetermined number of frames and their fidelity values.

As apparent from the above description, the present invention provides a moving image search method wherein the search time can be shortened by a considerable amount according to an appropriate threshold value set by a user and the searched result can satisfy the level desired by the user, thereby making it possible to overcome the limitations in network service speed and time to some degree for a future video search engine service on the Internet.

Further, the present invention provides a moving image browsing method wherein the effective and schematic expressions of moving image information, pursued in server environments, can be made within a quantitative threshold range, so that key frames can be variously expressed within a desired range. These variable and various information expressions make it possible to readily provide desired information to the user.

Moreover, the present invention provides a moving image summary method wherein a rate-constrained summary of moving image data can be made according to a user's request. Therefore, the present invention has the effect of accurately and readily providing a video edition service based on a constrained network band or video broadcast time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for expressing moving image data, the moving image data represented on a server system as a tree-structured moving image hierarchy, the tree-structured moving image hierarchy including a plurality of key frames, the method comprising:
   calculating a fidelity value of each of the plurality of key frames of the tree-structured moving image hierarchy;
   storing the fidelity value of each of the plurality of key frames of the tree-structured moving image hierarchy at an edge between adjacent ones of the plurality of key frames, each of the fidelity values signifying a degree to which the respective key frame represents progeny key frames; and
   traversing on the server system the key frames of the tree-structured moving image hierarchy based on the fidelity value stored at the edge between adjacent key frames.

2. The method as set forth in claim 1, wherein the fidelity value includes quantitative information.

3. The method as set forth in claim 1, wherein the fidelity value is a real number between 0 and 1 for normalization.

4. The method as set forth in claim 1, wherein each fidelity value is a maximum distance between one of the plurality of key frames and the progeny frames of the key frame.

5. The method as set forth in claim 1, wherein the fidelity value includes qualitative information.

6. A method for expressing moving image data, the moving image data represented as a tree-structured moving image hierarchy, the tree-structured moving image hierarchy including a plurality of key frames, the method comprising:

extracting select key frames of the tree-structured moving image hierarchy;

storing at a key frame storage unit the key frames extracted from the tree-structured moving image hierarchy;

calculating with a key frame fidelity calculator a fidelity value of each of the extracted key frames; and storing at the key frame storage unit the fidelity value of each of the extracted key frames at an edge between adjacent ones of the extracted key frames, each of the fidelity values signifying a degree to which the respective key frame represents progeny key frames;

wherein the moving image data can be searched, browsed, or summarized based on the fidelity values of the extracted key frames.

* * * * *